United States Patent Office 3,499,918
Patented Mar. 10, 1970

3,499,918
MANUFACTURE OF HIGHLY PURE
ALUMINUM ALCOHOLATE
Hiroshi Hasegawa, 77 Shindencho, and Mikio Sato, 38
Konakadaicho, both of Chibashi, Chiba-ken, Japan, and
Tuneo Yano, 2300 Kizuki-Isecho, Kawasakishi, Kanagawa-ken, Japan
No Drawing. Continuation-in-part of application Ser. No.
332,908, Dec. 23, 1963. This application Dec. 16, 1966,
Ser. No. 602,177
Claims priority, application Japan, Dec. 25, 1962,
37/57,491
Int. Cl. C07f 5/06
U.S. Cl. 260—448                                    12 Claims

ABSTRACT OF THE DISCLOSURE

In the production of aluminum alcoholate by the oxidation of an aluminum hydrocarbon compound having the general formula $AlR_3$ where R may be same or different and represents hydrocarbon radicals with molecular oxygen in the presence of an inert solvent followed by the stripping of the reaction mixture, the improvement which comprises adding dry ammonia to a reaction mixture at any time from the start of the oxidation to the end of the stripping in an amount of 0.01 to 10 mols per mole of the starting aluminum hydrocarbon compound thereby to obtain a highly pure aluminum alcoholate.

---

This application is a continuation in part of our co-pending application, Ser. No. 332,908 filed on Dec. 23, 1963, now abandoned.

The present invention relates to a process for the manufacture of highly pure alcohols, and more particularly to a process for the manufacture of highly pure alcohols from an aluminum hydrocarbon compound or a mixture thereof as a raw material.

There has been heretofore proposed a process for the manufacture of alcohols wherein aluminum hydrocarbon compounds are oxidized with molecular oxygen to form the corresponding aluminum alcoholates and the latter are then hydrolyzed to obtain the alcohols therefrom. The reactions of this process are generally as follows:

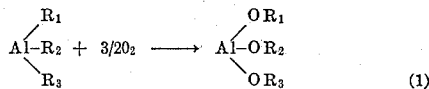

(1)

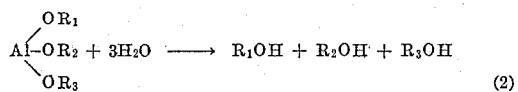

(2)

where $R_1$, $R_2$ and $R_3$ may be the same or different from one another and represent hydrocarbon radicals selected from the group consisting of alkyl, aryl, cycloalkyl, aralkyl and cycloalkyl-substituted alkyl radicals, provided at most two of the radicals $R_1$, $R_2$ and $R_3$ may be hydrogen atoms.

However, the oxidation reaction of aluminum hydrocarbon compounds is generally accompanied by complicated side reactions, whereby the formed aluminum alcoholates contain impurities such as olefins, paraffins and oxygenated compounds. Further, when a solvent is used in order to facilitate the oxidation, the formed aluminum alcoholates also contain the solvent. These impurities and solvent can be removed from the formed aluminum alcoholates in substantial amounts by a stripping or a reduced pressure distillation (hereinafter referred to as stripping), but the resulting aluminum alcoholates have a high iodine value. The substances having such a high iodine value (hereinafter referred to as high iodine value substances) are also retained in crude alcohols which are obtained by the hydrolysis of aluminum alcoholates and the separation of such high iodine value substances cannot be effected even if the crude alcohols are subjected to a fractional distillation under normal or reduced pressures.

Although, in general, a carbon-carbon double bond gives an iodine value, the high iodine value resulting from these crude alcohols is far higher than that to be given theoretically by the content of olefins contained in the crude alcohols. In view of this fact, it is clear that the high iodine value substances contain compounds other than olefins and in fact infrared and other type analyses indicate the presence of substances which are assumed to be conjugated unsaturated aldehydes, unsaturated alcohols and the like although the chemical structures of these assumed substances have not been sufficiently confirmed. Although the reasons for the formation of these high iodine value substances are not also clear, it is assumed that the originating materials of these high iodine value substances are probably formed in the oxidation step and thereafter the latter are converted to these high iodine value substances in a heat-treatment step such as stripping and the like. In the present invention, therefore, by the term "high iodine value substances" there is accordingly meant impurities contained in crude alcohols which are obtained by the hydrolysis of aluminum alcoholates and the term is defined as substances which give an iodine value when tested under the Japanese Industrial Standards (JIS) K–8004–1961 "General Testing Methods for Reagent Chemicals."

The impurities such as these high iodine value substances contained in the alcohols have considerable bad effects on the qualities, particularly color and odor of intended products in such cases as, for example, the production of plasticizers, surface active agents, etc. wherein these alcohols are used as a raw material, and thus it is necessary to remove the impurities from the alcohols as much as is possible.

Accordingly, the primary object of the present invention is to provide a process for the manufacture of highly pure alcohols in high yield by preventing the formation of high iodine value substances therein. Other objects will become apparent to those skilled in the art in the examination of the following description.

For purification processes for alcohols, there have heretofore been proposed a hydrogenation process, a process for the purification using alkali metal boron hydride (U.S. Patent No. 2,957,023), an extraction process (U.S. Patent No. 2,954,392) and a process of blowing an incondensable gas (Japanese Patent Publication No. 6805/62 and No. 6806/62). In any case, however, these processes present the disadvantages in that they have not been particularly effective in the purification of alcohols derived from aluminum hydrocarbon compounds and that purification costs therefor are very expensive. Although it has been proposed in U.S. Patent No. 3,017,438 that an alkyl aluminum be incompletely oxidized to prevent side-reactions and that an unreacted alkyl aluminum be treated with a substance having an active OH radical such as an alcohol to convert the unreacted alkyl aluminum into free paraffins which may be distilled off therefrom, such process is not desirable due to the decrease of yield of alcohol.

According to the present invention, there is provided a process for the manufacture of highly pure alcohols represented by the general formula ROH where R represents a hydrocarbon radical selected from the group consisting of alkyl, aryl, cycloalkyl, aralkyl and cycloalkyl-substituted alkyl radicals which comprises the steps of oxidizing an aluminum hydrocarbon compound having the general formula AlR$_3$ where R may be the same or different one another and represents hydrocarbon radicals selected from the group consisting of alkyl, aryl, cycloalkyl, aralkyl and cycloalkyl-substituted alkyl radicals, provided at most two of the three radicals R may be hydrogen atoms with molecular oxygen at a temperature of —50 to 150° C. and at a pressure of 1 to 70 atms. in the presence of an inert solvent to form the corresponding aluminum alcoholates, subjecting the resulting reaction mixture comprising the aluminum alcoholates, inert solvent and impurities formed during the oxidation to a stripping to remove the inert solvent and light impurities and then subjecting the resulting mixture substantially free from the inert solvent and light impurities to a hydrolysis to convert the aluminum alcoholates to the corresponding alcohols, characterized in that dry ammonia is added to a reaction mixture at any time from the start of the oxidation step to the end of the stripping step of the process in an amount of 0.01 to 10 mols. per mole of the starting aluminum hydrocarbon compound.

In one aspect of the present invention, therefore, the addition of ammonia to a reaction mixture may be carried out during the oxidation step.

According to another aspect of the present invention, the addition of ammonia to a reaction mixture may be carried out after the oxidation has reached completion but before the stripping is begun.

According to a further aspect of the present invention, the addition of ammonia to a reaction mixture may be carried out during the stripping step.

Detailed embodiments of all the aspects above-mentioned of the present invention will be clear from the following descriptions.

According to the present invention, very highly pure alcohols having a low iodine value can be obtained in a high yield and cheaply by using a simple method, as compared with prior known processes. In addition, the alcohols obtained by the process of the present invention have a low APHA value in a sulfuric acid test.

A wide variety of aluminum hydrocarbon compounds which have been used as raw material in the prior art processes may be used in the process of the present invention. Typically, the starting aluminum hydrocarbon compounds include those having the same or different alkyl radicals of 2 to 30 carbon atoms each, those having the same or different aryl radicals of 6 to 10 carbon atoms each such as the phenyl radical and the p-tolyl radical, those having the same or different cycloalkyl radicals of 6 to 10 carbon atoms each such as the cyclohexyl radical, those having the same or different alkyl-substituted cycloalkyl radicals of 6 to 10 carbon atoms each such as the 4-ethyl cyclohexyl radical, those having the same or different aralkyl radicals of 7 to 10 carbon atoms each such as the β-phenylethyl radical and those having the same or different cycloalkyl substituted alkyl radicals of 7 to 10 carbon atoms each such as the β-cyclohexyl ethyl radical. Among them, trialkyl aluminum compounds having alkyl radicals of 6 to 24 carbon atoms each are particularly preferable. Further, there may be used aluminum hydrocarbon compounds in which up to two of the three hydrocarbon radicals bonded to aluminum atom are replaced by the hydrogen atoms, if desired.

The ammonia which may be employed in the process of the present invention may be either in the form of gas or liquid, but is to be in a dry form in order to prevent the hydrolysis of aluminum alcoholates and/or aluminum hydrocarbon compounds before the hydrolysis step. The amount of ammonia to be added may vary within the range of 0.01 to 10 mols. per mole of the starting aluminum hydrocarbon compound depending upon the reaction conditions used and the time of addition of ammonia. The addition of ammonia to a reaction mixture may be carried in such a manner as continuous, intermittent or at a time.

The oxidation step of the aluminum hydrocarbon compounds according to the present invention may be carried out with the use of molecular oxygen in the presence of an inert solvent, at a temperature of —50 to 150° C., preferably 0 to 70° C. under a pressure of 1 to 70 atmospheres, preferably 1 to 30 atmospheres. The addition of ammonia to a reaction mixture during the oxidation step may be carried out at the beginning of the reaction, but it is preferable to start the addition of ammonia after at least 50% of said oxidation has taken place for reasons of economy. The time for the starting of the addition of the ammonia may be varied by the oxidation temperature, and in the case where a lower temperature is used it is preferable to start the addition of ammonia when the oxidation has proceeded to quite a degree. By constrast, in the case where a higher temperature is employed it is preferable to start the addition of ammonia when the oxidation has proceeded a lesser degree. The amount of ammonia used in the oxidation step is in the range of 0.01 to 10 mols. preferably in the range of 0.05 to 10 mols. per mole of the starting aluminum hydrocarbon compound. Usually, the addition of less than two mols. of ammonia per mole of the aluminum hydrocarbon compounds gives a satisfactory result. The effect of pressure on the oxidation is small, but under elevated pressures, smaller amount of ammonia may be used and the use of liquid ammonia is preferable. Particularly preferable conditions in the oxidation step are the introducing of the ammonia after 50 to 70% of the oxidation is completed at a temperature of 20 to 70° C. under a pressure of 1 to 30 atmospheres and the introducing of the ammonia when more than 70% of the oxidation has been completed at a temperature of —15 to 20° C. under a pressure of 1 to 30 atmospheres.

The addition of ammonia to a reaction mixture may also be carried out after the oxidation reaction has reached completion, namely dry ammonia may be added to the reaction product mixture obtained after the completion of the oxidation. In such a case, the addition of ammonia may be carried out at normal or elevated pressures and the amount of ammonia to be added is in the range of 0.01 to 10 moles, preferably 0.1 to 10 moles of the starting aluminum hydrocarbon compound. The temperature condition at this stage is not an essential factor, but it is desirable to add ammonia under such condition that the highest concentration of it may be maintained. A preferred result can be obtained by adding dry ammonia to the oxidation reaction mixture which was obtained by the oxidation at a comparatively low temperature, for example —20 to 0° C.

The addition of ammonia to a reaction mixture may also be carried out during the stripping step. In such a case, dry ammonia may be added alone or together with an inert gas in a ratio of 0.01 to 10 mols., preferably 0.1 to 10 mols. of ammonia per mol. of the aluminum hydrocarbon compounds to a stripping tower which is operated at a bottom temperature of normal temperature to 250° C. under a normal or a reduced pressure.

Most preferably, the ammonia treatment according to the present invention is to be applied during the oxidation step, particularly during the latter half of it. It is clear that improved results can, of course, be obtained when a combination of two or more steps of the above-mentioned ammonia treatments is used. In the most preferable combination, the ammonia treatment may be carried out during and after the oxidation step or during the oxidation and stripping steps.

The present invention is further illustrated by the following examples and comparative examples:

EXAMPLE 1

65% by weight of toluene, 33.5% by weight of alkyl aluminum compounds having mixed alkyl radicals on the average of 8.0 carbon atoms and 1.5% by weight of olefins were mixed. 7 liters of the mixture (containing about 5.8 mols. of the alkyl aluminum compounds) were charged into a reactor and were oxidized with air at a temperature of 50° C. under a pressure of 10 atmospheres while cooling the reaction mixture in order to remove the reaction heat. When 60% of the alkyl aluminum compounds were converted into aluminum alcoholates, 50 cc. of dry liquid ammonia (1.8 mols.; about 0.3 mol. per 1 mol. of the raw alkyl aluminum compounds) were added to the reaction mixture at a rate of 50 cc./hr. while the oxidation was continued. After the oxidation was completed, the oxidation product was stripped under a reduced pressure and the obtained aluminum alcoholates were hydrolyzed to obtain crude alcohols. The purity, yield (expressed in percentage to the theoretical amount of the corresponding alcohols derived from the starting aluminum hydrocarbon compound) and iodine value of the obtained crude alcohols were 99.5%, 95.5% and 0.5, respectively, and those of the purified alcohols which were obtained by distilling the crude alcohols under a reduced pressure of 1 mm. Hg were 99.8%, 92.5% and 0.25, respectively. The alcohols contained a minor amount of paraffins as impurities, but other impurities were not detected by gas chromatography.

EXAMPLE 2

Using the same raw materials and apparatus as described in Example 1, an oxidation was carried out at a temperature of 15° C. under a pressure of 10 atmospheres. When 90% of the alkyl aluminum compounds were converted into aluminum alcoholates, 15 cc. of dry liquid ammonia were added at a time thereto and thereafter 15 cc. of the ammonia were introduced at a rate of about 30 cc. of ammonia per hour while the oxidation being continued. After the oxidation was completed, the oxidation product was allowed to stand for one hour and was stripped under reduced pressure and then was hydrolyzed to obtain the crude alcohols. The purity, yield and iodine value of the crude alcohols were 99.3%, 92% and 0.8, respectively, and those of the purified alcohols which were obtained by distilling the crude alcohols as described in Example 1 were 99.7%, 89% and 0.4, respectively.

Further, the purity, yield and iodine value of the purified alcohols which were obtained by the similar method as described above except that the oxidation temperature was 0° C. were 99.8%, 90% and 0.3, respectively.

EXAMPLE 3

The procedure of Example 1 was repeated except that the addition of dry liquid ammonia was begun from the start of oxidation and that 51 cc. in total of ammonia were added to the oxidation step at a rate of 10 cc./hr. until the conversion percentage of alkyl aluminum compounds to aluminum alcoholates reached 30%, at a rate of 20 cc./hr. until it reached 50% and thereafter at a rate of 40 cc./hr. After the oxidation product mixture was allowed to stand for one hour, the mixture was stripped under a reduced pressure and thereafter was hydrolyzed to obtain crude alcohols. The purity, yield and iodine value of the crude alcohols were 99.5%, 95.0% and 0.5, respectively. The crude alcohols were distilled as described in Example 1 to obtain purified alcohols. The purity, yield and iodine value of the purified alcohols were 99.8%, 92.0% and 0.3, respectively.

In the above case, if ammonia was added at a rate of 40 cc./hr. after the conversion percentage of alkyl aluminum compounds to the corresponding aluminum alcoholates reached 25%, 60 cc. of ammonia was necessary to obtain the similar results to the above. Thus, the results were the same as those of the above except that the increase in yield of alcohols was about 0.5%.

EXAMPLE 4

65% by weight of toluene, 1.5% by weight of olefins and 33.5% by weight of alkyl aluminum compounds were mixed. 1.2 litres of the mixed solution (containing about 1 mole of the raw alkyl aluminum compounds) were charged in a reactor and were oxidized with air at a temperature of 50° C. under one atmosphere while cooling the reactor in order to remove the reaction heat. After the oxidation attained 100%, the oxidation product mixture was transferred to a reaction vessel provided with a stirrer and then 5 mols. of dry ammonia were added while stirring to the reaction product at a rate of 1 mol./hr. at a temperature of 0° C. under one atmosphere for five hours. The ammonia-treated oxidation product mixture was stripped to obtain the aluminum alcoholates followed by hydrolysis of the alcoholates to form crude alcohols. The purity, yield and iodine value of the crude alcohols were 99.0%, 87.0% and 2.5, respectively, and those of the purified alcohols which were obtained by distilling the crude alcohols as described in Example 1 were 99.5%, 84.0% and 1.5, respectively.

The above method was repeated except that the temperature for ammonia treatment of the oxidation product was 110° C. The purity, yield and iodine value of the obtained crude alcohols were 93.0%, 86% and 2.6, respectively, and those of the purified alcohols which were obtained by distilling the crude alcohols were 99.5%, 83% and 1.6, respectively.

EXAMPLE 5

Example 1 was repeated except that the temperature employed was −15° C., the pressure was 10 atmospheres and there was no addition of ammonia during the oxidation step. When the oxidation was completed about 100%, 30 cc. of dry liquid ammonia were added to the reaction mixture at a time and immediately the introduction of air and the cooling were stopped. The reaction mixture was caused to circulate through the reactor at about 10 atmospheres by a pump. After the temperature of the reaction mixture attained room temperature, the circulation of the reaction mixture was continued for further one hour. Thereafter, the temperature was elevated to 110° C. and the circulation of the reaction mixture was further contained for another hour. The solution was then cooled to a temperature of 50° C. and air was added thereto for twenty minutes. As a result, ammonia was purged from the reaction mixture and recovered, and at the same time, a minor amount of the unreacted alkyl aluminum compounds, if any, was completely oxidized. This oxidation product was stripped under a reduced pressure and hydrolyzed to form the corresponding crude alcohols. The purity, yield and iodine value of the crude alcohols were 99.4%, 95.5% and 0.5, respectively, and those of the purified alcohols which were obtained by the distillation of the crude alcohols as in Example 1 were 99.8%, 93.5% and 0.3, respectively.

The above method was repeated except that the oxidation temperature employed was 0° C. The purity, yield and iodine value of the obtained purified alcohols were 99.8%, 92.5% and 0.4, respectively.

EXAMPLE 6

An oxidation product obtained by the same procedure as that used in Example 4, except that ammonia was not added to the oxidation product, was subjected to a stripping step during which dry ammonia gas was added in an amount of 1 mol. per mol. of the raw alkyl aluminum compounds through the bottom of the stripping tower for two hours, the amount of ammonia gas being correspondingly decreased as the degree of the vacuum in the tower increased. The lowest pressure and the highest temperature in the tower were maintained at 3 mm. Hg and 250° C., respectively. The purity, yield and iodine value of crude alcohols which were obtained by the hydrolysis of the obtained aluminum alcoholates were 99.0%, 88.0% and 1.7, respectively, and those of the purified alcohols which were obtained by the distillation of the crude alcohols as in Example 1 were 99.5%, 84.0% and 0.9, respectively.

EXAMPLE 7

7 litres of a mixed solution comprising 65% by weight of toluene and 35% by weight of alkyl aluminum compounds (containing about 6 mols. of alkyl aluminum compounds) were charged in a reactor and the alkyl aluminum compounds were oxidized with air at a temperature of 50° C. under a pressure of 20 atmospheres while cooling the reaction mixture in order to remove the generated reaction heat. When 65% of the alkyl aluminum compounds were converted into the corresponding aluminum alcoholates, 40 cc. of dry liquid ammonia (1.5 mols.; about 0.25 mols. per mol. of the raw alkyl aluminum compounds) were added to the reaction mixture at a rate of 40 cc./hr. for one hour while continuing the oxidation reaction. After the oxidation was completed and the blowing of air was stopped, the introduction of ammonia was further continued for a short time. The oxidation product mixture was stripped while 0.6 mol. ammonia per mol. of the raw alkyl aluminum compounds were added thereto. The blowing rate of ammonia was correspondingly decreased as the degree of vacuum was increased. The blowing period of ammonia was two hours. The lowest pressure and highest temperature in the stripping tower were maintained at 3 mm. Hg and 250° C., respectively. The purity, yield and iodine value of the crude alcohols which were obtained by removing out ammonia from the aluminum alcoholates and then by hydrolyzing the latter with 20% aqueous sulfuric acid were 99.6%, 96.5% and 0.4, respectively, and those of the purified alcohols which were obtained by distilling the crude alcohols under a reduced pressure of 1 mm. Hg were 99.8%, 94.5% and 0.2, respectively.

EXAMPLE 8

7 litres of a mixed solution comprising 68% by weight of toluene and 32% by weight of tri-($\beta$-phenyl-ethyl) aluminum (containing about 6 mols. of tri-($\beta$-phenyl-ethyl) aluminum) were charged in a reactor and an air oxidation of the latter was carried out at a temperature of 50° C. under a pressure of 10 atmospheres while cooling the reaction mixture in order to remove the generated reaction heat and the reaction mixture was circulated by a pump. When 63% of the above triaralkyl aluminum compound was converted to the corresponding alcoholate, 50 cc. of dry liquid ammonia were added thereto at a rate of about 40 cc./hr. for 75 minutes while the oxidation was continued. After the oxidation was completed, the resultant oxidation product mixture was allowed to stand for one hour and then sthripped and hydrolyzed. The purity and yield of the obtained crude $\beta$-phenyl-ethyl alcohols were 99.4% and 94.5%, respectively. By the distillation of the crude $\beta$-phenyl-ethyl alcohols, $\beta$-phenyl-ethyl alcohol having a 99.8% purity was obtained in a yield of 92.5%. The presence of a double bond was not detected by an infrared absorption spectrum.

The above procedure was repeated except that tri-($\beta$-p-tolyl-ethyl) aluminum was used in place of tri-($\beta$-phenyl-ethyl) aluminium. In this case, $\beta$-p-tolyl-ethyl alcohol having a 99.8% purity was obtained in a yield of 93%. The presence of a double bond was not detected by an infrared absorption spectrum.

EXAMPLE 9

7 litres of a mixed solution containing 66% by weight of toluene and 34% by weight of tri-($\beta$-cyclohexyl-ethyl) aluminum (containing about 6 mols. of tri-($\beta$-cyclohexyl-ethyl) aluminum) were used. The purity, yield and iodine value of the crude $\beta$-cyclohexyl-ethyl alcohol which was obtained similarly as in Example 8 were 99.7%, 95.0% and 0.4, respectively. By the distillation of the crude alcohols, $\beta$-cyclohexyl-ethyl alcohol having a 99.8% purity and a 0.2 iodine value was obtained in a yield of 93.0%. The presence of a double bond was not detected by an infra-red absorption spectrum.

The above procedure was repeated except that tri-($\beta$-4-methyl-cyclohexyl-ethyl) aluminum was used in place of tri-($\beta$-cyclohexyl-ethyl) aluminum. Similarly, $\beta$-4-methyl-cyclohexyl-ethyl alcohol having a 99.8% purity was obtained in a yield of 93.0%. The presence of a double bond was not detected by an infra-red absorption spectrum.

EXAMPLE 10

Example 8 was repeated except that 7 litres of a mixed solution containing 75% by weight of toluene and 25% by weight of tri-phenyl aluminum (containing about 6 mols. of tri-phenyl aluminum) were subjected to an oxidation while adding dry ammonia to the reaction mixture at a rate of 400 cc./hr. for two hours. Thereafter the same operation as in Example 8 was repeated except that the hydrolysis was carried out with 5 litres of 25% aqueous sulfuric acid. The obtained crude phenol was united with other phenol which was recovered by the extraction with 3 litres of toluene at one time from the aqueous layer. The purity and yield of the united crude phenol were 99.0% and 86.2%, respectively. By the distillation of the crude phenol, phenol having a 99.5% purity was obtained in a yield of 80.3%. The presence of a double bond was not detected by an infra-red absorption spectrum.

The above procedure was repeated except that tri-p-tolyl aluminum was used in place of tri-phenyl aluminum, and p-hydroxy toluene having a 99.7% purity was obtained in a yield of 83.1%. The presence of a double bond was not detected by an infra-red absorption spectrum.

EXAMPLE 11

Example 10 was repeated except that 7 litres of a mixed solution containing 74% by weight of toluene and 26% by weight of tri-cyclohexyl aluminum (containing about 6 mols. of tricyclohexyl aluminum) were used, and the hydrolysis was carried out similarly as in Example 8. The purity and yield of the obtained crude cyclohexyl alcohol were 99.5% and 95.0%, respectively. By the distillation of the crude cyclohexyl alcohol, cyclohexyl alcohol having a 99.7% purity was obtained in a yield of 93.0%. The presence of a double bond was not detected by an infra-red absorption spectrum.

The above procedure was repeated except that tri-(4-methyl-cyclohexyl) aluminum was used in place of tri-cyclohexyl aluminum, and thus 4-methyl-cyclohexyl alcohol having a 99.7% purity was obtained in a yield of 93.2%. The presence of a double bond was not detected by an infra-red absorption spectrum.

Comparative example

The purity, yield and iodine value of crude alcohols which were obtained by the same method as in Example 1 except that the addition of ammonia was not carried out were 96.5%, 83.5% and 7.5, respectively. Those of purified alcohols which were obtained by the distillation of the crude alcohols as in Example 1 were 97.6%, 75.2% and 5.5, respectively. The impurities in the purified alcohols were 0.5% by weight of paraffins, 0.3% by weight of olefins and 1.6% by weight of other materials.

Similar results were obtained when Example 4 was repeated except that the addition of ammonia was not carried out.

What we claim is:

1. In a process for the manufacture of aluminum alcoholate represented by the general formula $(RO)_3Al$ where R represents a hydrocarbon radical selected from the group consisting of alkyl, aryl, cycloalkyl, aralkyl and cycloalkyl substituted alkyl radicals having respectively 2 to 30, 6 to 10, 6 to 10, 7 to 10 and 7 to 10 carbon atoms comprising the steps of oxidizing an aluminum carbon compound having the general formula AlR₃ where R may be the same or different from one another and represents hydrocarbon radicals selected from the group consisting of alkyl, aryl, cycloalkyl, aralkyl and cycloalkyl substituted alkyl radicals, provided at most two of the three radicals R may be hydrogen atoms with molecular oxygen at a temperature of −50 to 150° C. and at a pressure of 1 to 70 atms. in the presence of an inert solvent to form the corresponding aluminum alcoholates, subjecting the resulting reaction mixture comprising the aluminum alcoholates, inert solvent and impurities formed during the oxidation to a stripping, the improvement which comprises adding dry ammonia to a reaction mixture at any time from the start of the oxidation step to the end of the stripping step of the process in an amount of 0.01 to 10 mols. per mole of the starting aluminum hydrocarbon compound.

2. A process as claimed in claim 1 wherein the addition of ammonia to a reaction mixture is carried out during said oxidation step.

3. A process as claimed in claim 1 wherein the addition of ammonia to a reaction mixture is carried out after said oxidation has reached completion but before said stripping is begun.

4. A process as claimed in claim 1 wherein the addition of ammonia to a reaction mixture is carried out during said stripping step.

5. A process as claimed in claim 1 wherein the addition of ammonia to a reaction mixture is carried out in a continuous manner.

6. A process as claimed in claim 1 wherein the addition of ammonia to a reaction mixture is carried out in an intermittent manner.

7. A process for the manufacture of alcohols represented by the general formula (RO)₃Al where R represents a hydrocarbon radical selected from the group consisting of alkyl, aryl, cycloalkyl, aralkyl and cycloalkyl substituted alkyl radicals having respectively 2 to 30, 6 to 10, 6 to 10, 7 to 10 and 7 to 10 carbon atoms comprising the steps of oxidizing an aluminum hydrocarbon compound having the general formula AlR₃, where R may be the same or different one another and presents hydrocarbon radicals selected from the group consisting of alkyl, aryl, cycloalkyl, aralkyl and cycloalkyl-substituted alkyl radicals, provided at most two of the three radicals R may be hydrogen atoms with molecular oxygen at a temperature of −50 to 150° C. and at a pressure of 1 to 70 atms. in the presence of an inert solvent to form the corresponding aluminum alcoholates, subjecting the resulting reaction mixture comprising the aluminum alcoholates, inert solvent and impurities formed during the oxidation to a stripping to remove the inert solvent and light impurities characterized in that dry ammonia is added to a reaction mixture during said oxidation step in an amount of 0.05 to 10 mols per mole of the starting aluminum compound.

8. A process as claimed in claim 7 wherein the addition of ammonia to a reaction mixture during said oxidation step is begun after at least 50% of said oxidation has taken place.

9. A process as claimed in claim 7 wherein said oxidation is carried out at a temperature of −15 to 20° C. and at a pressure of 1 to 30 atms. and the addition of ammonia to a reaction mixture during said oxidation step is begun after at least 70% of said oxidation has taken place.

10. A process as claim in claim 7 wherein said oxidation is carried out at a temperature of 20 to 70° C. and at a pressure of 1 to 30 atms. and the addition of ammonia to a reaction mixture during said oxidation step is begun after 50 to 70% of said oxidation has taken place.

11. A process for the manufacture of aluminum alcoholates represented by the general formula (RO)₃Al where R represents a hydrocarbon radical selected from the group consisting of alkyl, aryl, cycloalkyl, aralkyl, and cycloalkyl substituted alkyl radicals having respectively 2 to 30, 6 to 10, 6 to 10, 7 to 10 and 7 to 10 carbon atoms comprising the steps of oxidizing an aluminum hydrocarbon compound having the general formula AlR₃ where R may be the same or different from one another and represents hydrocarbon radicals selected from the group consisting of alkyl, aryl, cycloalkyl, aralkyl and cycloalkyl substituted alkyl radicals, provided at most two of the three radicals R may be hydrogen atoms with molecular oxygen at a temperature of −50 to 150° C. and at a pressure of 1 to 70 atms. in the presence of an inert solvent to form the corresponding aluminum alcoholates, subjecting the resulting reaction mixture comprising the aluminum alcoholates, inert solvent and impurities formed during the oxidation to a stripping to remove the inert solvent and light impurities characterized in that dry ammonia is added to a reaction mixture after said oxidation had reached completion but before said stripping is begun in an amount of 0.1 to 10 mols. per mole of the starting aluminum hydrocarbon compound.

12. A process for the manufacture of aluminum alcoholates represented by the general formula (RO)₃Al where R represents a hydrocarbon radical selected from the group consisting of alkyl, aryl, cycloalkyl, aralkyl, and cycloalkyl substituted alkyl radicals having respectively 2 to 30, 6 to 10, 6 to 10, 7 to 10 and 7 to 10 carbon atoms comprising the steps of oxidizing an aluminum hydrocarbon compound having the general formula AlR₃ where R may be the same or different from one another and represents hydrocarbon radicals selected from the group consisting of alkyl, aryl, cycloalkyl substituted alkyl radicals, provided at most two of the three radicals R may be hydrogen atoms with molecular oxygen at a temperature of −50 to 150° C. and at a pressure of 1 to 70 atms. in the presence of an inert solvent to form the corresponding aluminum alcoholates, subjecting the resulting reaction mixture comprising the aluminum alcoholates, inert solvent and impurities formed during the oxidation to a stripping to remove the inert solvent and light impurities characterized in that dry ammonia is added to a reaction mixture during said stripping step in an amount of 0.1 to 10 mols per mole of the starting aluminum hydrocarbon compound.

References Cited

UNITED STATES PATENTS

| | | |
|---|---|---|
| 2,822,409 | 2/1958 | Gwynn et al. |
| 2,863,895 | 12/1958 | Kirshenbaum et al. |
| 3,030,402 | 4/1962 | Kirshenbaum et al. |
| 3,048,612 | 8/1962 | Walde. |
| 3,104,251 | 9/1963 | Foster et al. |
| 3,153,076 | 10/1964 | Wood et al. |

LEON ZITVER, Primary Examiner

JOSEPH E. EVANS, Assistant Examiner

U.S. Cl. X.R.

260—617, 618, 621, 631, 632